US012593348B2

(12) United States Patent
ElDokany et al.

(10) Patent No.: US 12,593,348 B2
(45) Date of Patent: Mar. 31, 2026

(54) rAPPs THAT GENERATE RECOMMENDATIONS FOR INTERFERENCE MITIGATION xAPPS

(71) Applicant: Dell Products, L.P., Round Rock, TX (US)

(72) Inventors: Yasmin ElDokany, Fifth Settlement (EG); Abdulrahman Darwish, Cairo (EG); Marwan Mansour, Alexandria (EG); May Zakaria, Milsa (EG); Mohamed Gamal Eldin, El-Ahram (EG)

(73) Assignee: DELL PRODUCTS, L.P., Round Rock, TX (US)

( * ) Notice: Subject to any disclaimer, the term of this patent is extended or adjusted under 35 U.S.C. 154(b) by 321 days.

(21) Appl. No.: 18/480,716

(22) Filed: Oct. 4, 2023

(65) Prior Publication Data

US 2025/0119932 A1    Apr. 10, 2025

(51) Int. Cl.
*H04W 72/541*        (2023.01)
*H04W 72/0446*       (2023.01)

(52) U.S. Cl.
CPC ..... *H04W 72/541* (2023.01); *H04W 72/0446* (2013.01)

(58) Field of Classification Search
None
See application file for complete search history.

(56) References Cited

U.S. PATENT DOCUMENTS

| | | |
|---|---|---|
| 8,804,555 B2 | 8/2014 | Turk et al. |
| 12,231,371 B2 | 2/2025 | Atawia |

| | | | |
|---|---|---|---|
| 2011/0013526 A1* | 1/2011 | Mosko | H04W 72/542 |
| | | | 370/252 |
| 2015/0172948 A1* | 6/2015 | Weber | H04W 36/0088 |
| | | | 370/252 |
| 2015/0180695 A1* | 6/2015 | Hashizume | H04L 27/2656 |
| | | | 370/329 |
| 2016/0218841 A1* | 7/2016 | Centonza | H04W 72/52 |
| 2017/0272977 A1* | 9/2017 | Rengarajan | H04W 40/16 |
| 2018/0006696 A1* | 1/2018 | Yue | H04B 7/0452 |
| 2022/0132579 A1* | 4/2022 | Awad | H04L 1/1812 |
| 2022/0407664 A1* | 12/2022 | Wang | H04W 16/04 |
| 2023/0246724 A1* | 8/2023 | Pateromichelakis | |
| | | | H04W 72/0453 |
| | | | 370/329 |

\* cited by examiner

*Primary Examiner* — Faruk Hamza
*Assistant Examiner* — Cassandra L Decker
(74) *Attorney, Agent, or Firm* — Amin, Turocy & Watson, LLP

(57) ABSTRACT

Architectures and techniques are described that can provide interference mitigation techniques by leveraging rApps the execute on a non-real time radio access network intelligent controller (non-RT RIC). One or more rApps can operate to assist in interference detection as well as interference avoidance. The interference detection rApp can determine a recommended threshold based on longer term trends or patterns, which can be used by an associated xApp executing on a near-real time radio access network intelligent controller (near-RT RIC) that typically lacks such capability. The interference avoidance rApp can determine a recommended slot to ban based on longer term trends or patterns, which can be used by an associated xApp or scheduler. For instance, the scheduler can use the slot banning recommendation from either the rApp or the xApp.

20 Claims, 11 Drawing Sheets

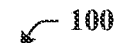
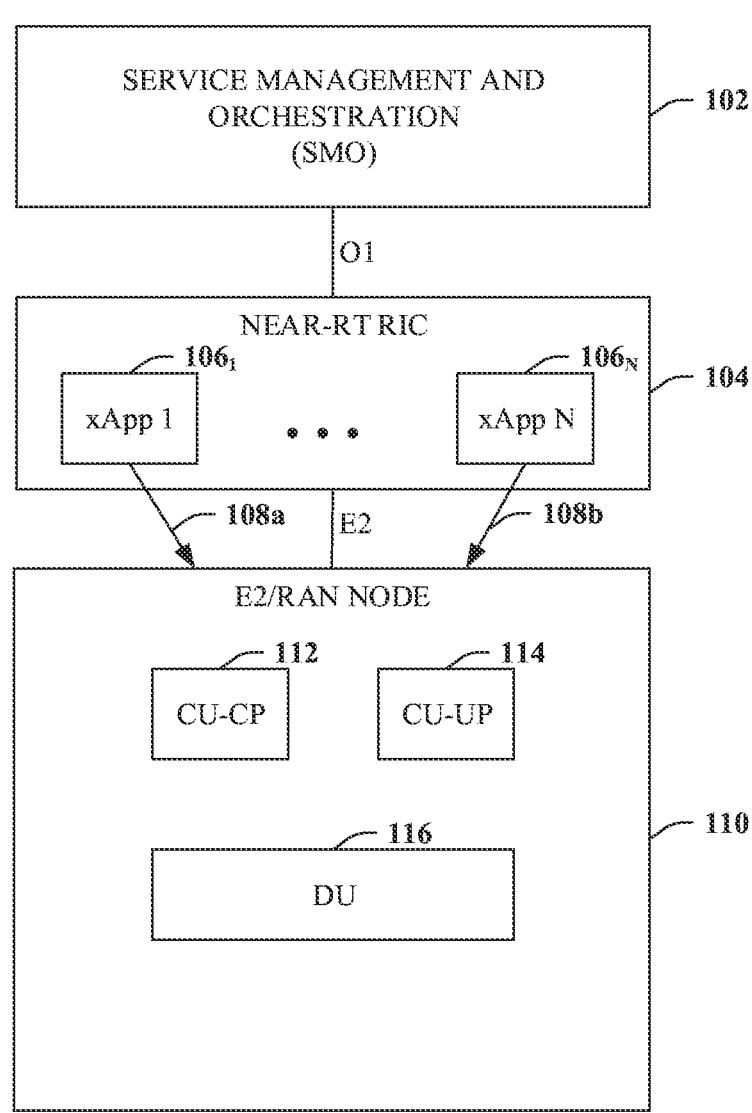
FIG. 1

300B

DENSITY

RSRP

SINR

FIG. 3A

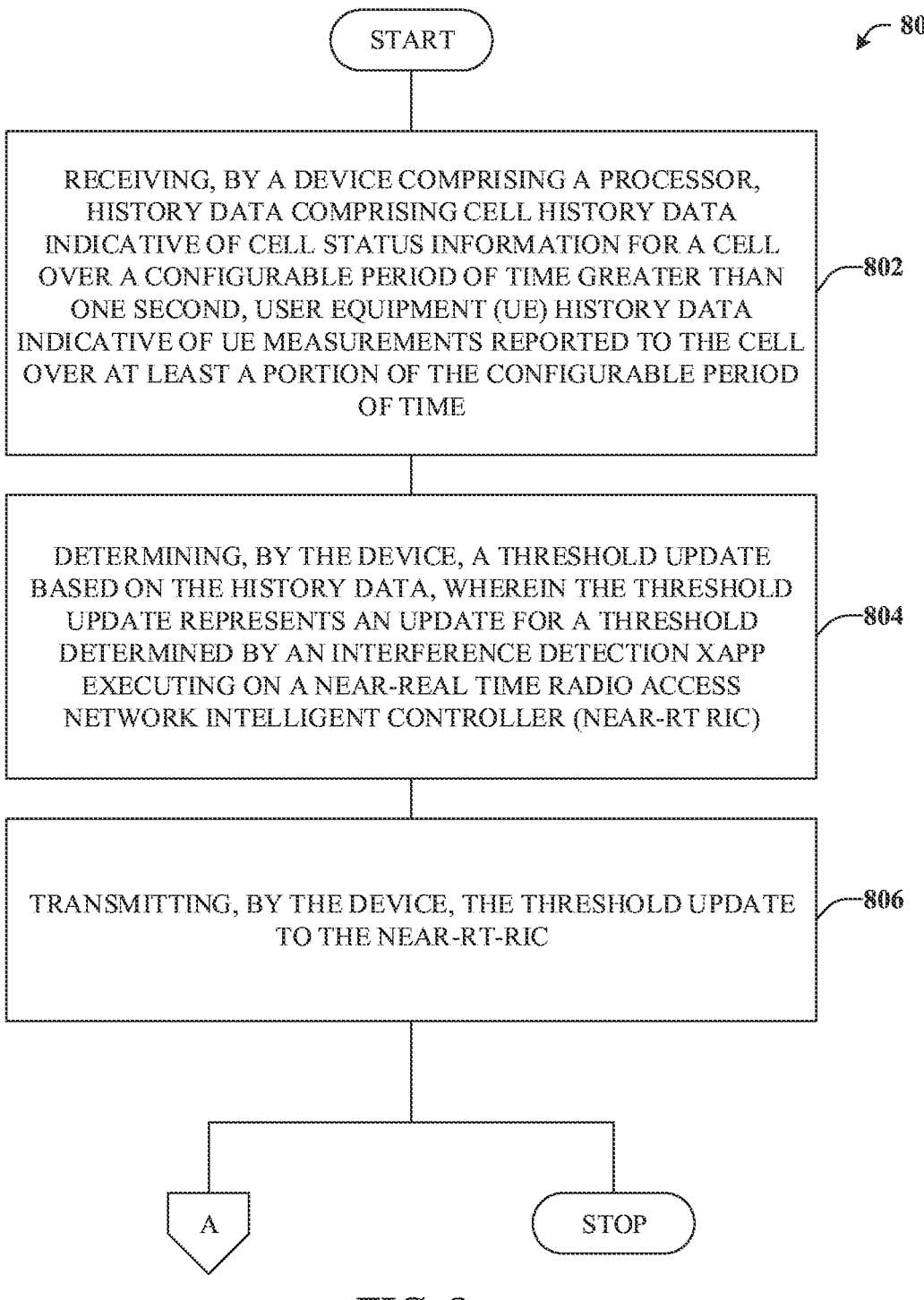

START

RECEIVING, BY A DEVICE COMPRISING A PROCESSOR, HISTORY DATA COMPRISING CELL HISTORY DATA INDICATIVE OF CELL STATUS INFORMATION FOR A CELL OVER A CONFIGURABLE PERIOD OF TIME GREATER THAN ONE SECOND, USER EQUIPMENT (UE) HISTORY DATA INDICATIVE OF UE MEASUREMENTS REPORTED TO THE CELL OVER AT LEAST A PORTION OF THE CONFIGURABLE PERIOD OF TIME — 802

DETERMINING, BY THE DEVICE, A THRESHOLD UPDATE BASED ON THE HISTORY DATA, WHEREIN THE THRESHOLD UPDATE REPRESENTS AN UPDATE FOR A THRESHOLD DETERMINED BY AN INTERFERENCE DETECTION XAPP EXECUTING ON A NEAR-REAL TIME RADIO ACCESS NETWORK INTELLIGENT CONTROLLER (NEAR-RT RIC) — 804

TRANSMITTING, BY THE DEVICE, THE THRESHOLD UPDATE TO THE NEAR-RT-RIC — 806

A

STOP

FIG. 8 rAPPs THAT GENERATE RECOMMENDATIONS FOR INTERFERENCE MITIGATION xAPPS

BACKGROUND

Open Radio Access Network (O-RAN) is a promising technology that enables network operators to easily integrate different components from different vendors by suggesting new open interfaces and architectures. O-RAN introduces the intelligence of a radio access network (RAN) through a near-real-time RAN Intelligent Controller (near-RT RIC) and non-real-time RAN Intelligent Controller (non-RT RIC), which can enable different vendors to deploy different xApps and rApps to improve network performance in different network slices. For example, an xApp that is deployed on a near-RT RIC can be purposed to change network configuration elements (e.g., parameters of an E2 Node) based on network metrics data or other data. As a representative example, many near-RT RICs deploy certain xApps that operate to mitigate interference.

BRIEF DESCRIPTION OF THE DRAWINGS

Numerous aspects, embodiments, objects, and advantages of the present embodiments will be apparent upon consideration of the following detailed description, taken in conjunction with the accompanying drawings, in which like reference characters refer to like parts throughout, and in which:

FIG. 1 depicts a schematic block diagram 100 illustrating example interference mitigation xApps that attempt to detect and avoid interference in accordance with certain embodiments of this disclosure;

FIG. 3A depicts graph illustrating user equipment (UE) data plotted as a first metric over a second metric and associated Eigenvectors in accordance with certain embodiments of this disclosure;

FIG. 3B depicts a density graph illustrating an orthogonal projection of the of the UE data projected on one of the Eigenvectors in accordance with certain embodiments of this disclosure;

FIG. 8 illustrates an example method that can utilize interference mitigation rApps to update or improve operation of interference detection xApps in accordance with certain embodiments of this disclosure;

DETAILED DESCRIPTION

Overview

Figure 2:
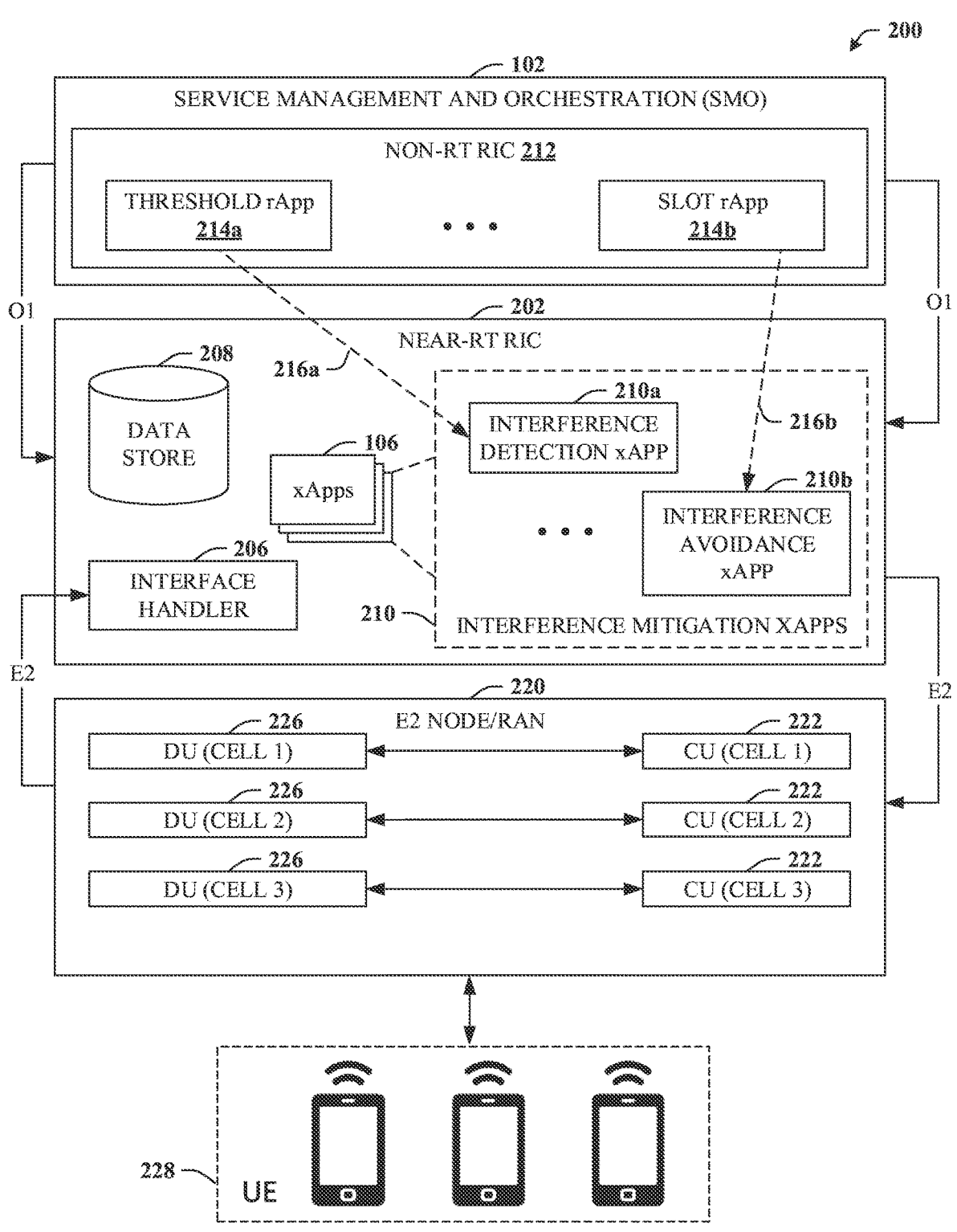
FIG. 2 depicts a schematic block diagram illustrating an example system that can utilize interference mitigation rApps to update or improve operation of interference detection xApps in accordance with certain embodiments of this disclosure.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It may be evident, however, that the disclosed subject matter may be practiced without these specific details. In other instances, well-known structures and devices are shown in block diagram form in order to facilitate describing the disclosed subject matter.

In an O-RAN deployment, the near-RT RIC can comprise many different extended applications (xApps), each of which can be executed to provide some specific objective such as interference detection, interference avoidance, or other interference mitigation behavior. Interference mitigation can be significant for network operators, as the presence of interference can severely degrade the signal quality of affected user equipment (UE) service.

Some example differentiating considerations with respect to RAN Intelligent Controllers, such as near-RT RICs, and non-RT RICs are as follows. In this regard, example non-limiting non-RT RIC functions include service and policy management, RAN analytics, and model training for the near-RT RICs. For instance, the non-RT RIC enables non-real-time (e.g., a first range of time, such as >1 second) control of RAN elements and their resources through applications, e.g., specialized applications called rApps. Example, non-limiting near-RT RIC functions enable near-real-time optimization and control and data monitoring of O-RAN Centralized Unit (O-CU) and O-RAN Distributed Unit (O-DU) nodes in near-RT timescales (e.g., a second range of time representing less time than the first time range, such as between 10 milliseconds and 1 second). In this regard, the near-RT RIC controls RAN elements and their resources with optimization actions that typically take about 10 milliseconds to about one second to complete, although different time ranges can be selected. The near-RT RIC can receive policy guidance from the non-RT RIC and can provide policy feedback to the non-RT RIC through specialized applications called xApps.

FIG. 1 depicts a schematic block diagram 100 illustrating example interference mitigation xApps that attempt to detect and avoid interference in accordance with certain embodiments of this disclosure. As illustrated, service management and orchestration (SMO) 102 can communicate with near-RT RIC 104 via an O1 interface. SMO 102 can operate as a management and orchestration layer that controls configuration and automation aspects of RIC and RAN elements.

Near-RT RIC 104 can comprise various xApps 106, illustrated here as xApps 106₁-106_N, where N can be any whole number. Near-RT RIC 104 can communicate with radio access network (RAN) node and/or E2 node 110 via an E2 interface. In some embodiments, E2 node 110 can represent a RAN portion of the network architecture, which can serve user equipment devices or the like. RAN/E2 node 110 can include one or more centralized unit (CU), including a centralized unit control plane (CU-CP) 112 and a centralized unit user plane (CU-UP) 114. E2 node 110 can further comprise one or more distributed unit (DU) 116, as understood in the art. Thus, workloads of the xApps 106 are executed by Near-RT RIC 104, typically using data collected from the RAN portion of the network (e.g., E2 node 110). In response, control messages 108 can be delivered to E2 node 110 based on the data collected in order to improve or otherwise reconfigure an element of E2 node 110.

A given control message can therefore represent an action 108 to take on E2 node 110, typically instructing E2 node 110 to modify some parameter or other configuration or setting. For example, suppose some portion of xApps 106 are directed to interference mitigation, which can operate to detect and/or reduce interference in the operation of E2 node 110. For instance, suppose xAPP 106₁ is an interference detection xApp and xApp 106_N is an interference avoidance xApp.

In that case, the interference detection xApp (e.g., xAPP 106₁) might use some type of machine learning model or another suitable model identify the existence of interference in communication occurring in the RAN. In some embodiments, xAPP 106₁ might use any suitable information available at the near RT-RIC 104 to determine certain hyperparameters that can then be used to determine to determine the presence of interference. xAPP 106₁ may control E2 node 110 via control messages 108a, if appropriate.

If interference is detected, the interference avoidance xApp, (e.g., xApp 106_N) can operate to take certain measure to reduce the interference. As one example, xApp 106_N can use any suitable information available at the near RT-RIC 104 to determine scheduled slots for a UE that are impacted by the detected interference. xApp 106_N can also ban one or more of the most highly impacted time slots in order to avoid interference. Thus control message 108b can be a request to ban one or more time slots so that interference can be reduced.

Hence, previous approaches to interference mitigation are generally directed to xApps 106 that execute on near-RT RIC 104. However, certain issues can arise in the context of interference mitigation being entirely controlled by xApps 106 and/or by relying on information that is available at near-RT RIC 104.

For example, inference patterns may change with changes in a network state such as whether the state of a given cell reflects a high or low load or is near or well below capacity. Current xApp-based interference detection approaches typically use pretrained models and/or preset thresholds for post processing. Moreover, data consumed by xApps 106 is limited to the data available to near-RT RIC 104, which is generally extremely transient. It is observed that state changes of a given cell can often be significantly impacted by long-term trends that near-RT RIC 104 is not equipped to identify or detect. Thus, updates to interference detection hyperparameters associated with associated xApps 106 are typically done manually by skilled experts in an offline manner. Moreover, current interference avoidance xApps

106 rely on resource banning that is based on essentially instantaneous feedback from impacted UEs or manual configuration of cell resources.

Furthermore, certain machine learning xApps 106 can suffer from concept drift. Concept drift is a phenomenon in machine learning that occurs when the statistical properties of the target variable, which the model is trying to predict, change over time in unforeseen ways. As a result, operation of an associated xApp 106 may not remain suitable for its intended purpose.

In order to mitigate these and other issues, the disclosed subject matter is in some embodiments directed to leveraging rApps that execute on a non-RT RIC to provide updates to counterpart xApps that execute on near-RT RIC 104. Since the non-RT RIC can reside in SMO 102, which is not subject to rigorous time constraints and will typically have more available resource and information, rApps can operate to detect long-term patterns relating to interference that are typically not available to xApps on near-RT RIC 104. Such can allow dynamic control of post processing threshold for interference detection based on longer term traffic patterns. Such can also facilitate the use of long term traffic analysis to recommend slots to ban. Hence, the output of a given rApp can be provided, via ORAN architecture, as an input to an associate xApp 106, for instance, as enrichment information. Addition detail can be found with reference to FIG. 2 and subsequent drawings.

Example Systems

Referring now to FIG. 2, a schematic block diagram is depicted illustrating an example system 200 that can utilize interference mitigation rApps to update or improve operation of interference detection xApps in accordance with certain embodiments of this disclosure. For example, near-RT RIC 202 can comprise xApps 106, as detailed in connection with near-RT RIC 104 of FIG. 1. Certain xApps 106 can be programmed to apply one or more control actions (e.g., via control messages transmitted over an E2 interface) that affect one or more parameters of an E2 node 220.

As mentioned, E2 node 220 can represent elements of a RAN portion such as CU 222 or DU 226. As illustrated, elements of E2 node 220 can serve a group of user equipment (UE) 228. Service of UE 228 can be optimized or improved by operation of xApps 106.

Some of these xApp 106 can be directed to interference mitigation, which is illustrated as interference mitigation xApps 210. For instance, interference mitigation xApps 210 can comprise one or more interference detection xApps 210a, interference avoidance xApps 210b, or other suitable interference mitigation xApps 210.

Interference detection xApp 210a can analyze UE measurements or feedback (e.g., negative acknowledgements (NACKs)) to determine the presence of interference. Typically, interference can be detected by comparing certain measurements to thresholds (e.g., hyperparameters of the model). Thus, interference detection xApp 210a can detect UEs that are suffering from interference. Generally, interference avoidance xApp 210b can identify impacted UE scheduled slots and request that an associated cell (or other E2 node 220) ban highly impacted slots to avoid interference.

In addition to xApps 106, near-RT RIC 202 can comprise interface handler 206. Interface handler 206 can allow a controller of the near-RT RIC 202 to receive data from all the cooperating cells. Near-RT RIC 202 can further comprise data store 208. Data store 208 can represent a local store for a given near-RT RIC 202. Typically, data store 208 can be configured to store key performance indicators (KPIs) and other network metrics as well as control actions that were executed or applied to E2 node 220 within a session or historically.

Pertinent to the disclosed subject matter, SMO 102 can comprise non-real time radio access network intelligent controller (non-RT RIC) 212. For some further context, example, non-limiting non-RT RIC 212 functions can include service and policy management, RAN analytics, and model training for the near-RT RIC 202. In this regard, the Non-RT-RIC 212 enables non-real-time (e.g., a first range of time, such as >1 second) control of RAN elements and their resources through applications, e.g., specialized applications called rApps, that frequently communicate via an R1 interface. Example, non-limiting near-RT RIC 202 functions enable near-real-time optimization and control and data monitoring of O-CU and O-DU nodes in near-RT timescales (e.g., a second range of time representing less time than the first time range, such as between 10 milliseconds and 1 second). In this regard, the near-RT RIC 202 controls RAN elements and their resources with optimization actions that typically take about 10 milliseconds to about one second to complete, although different time ranges can be selected.

Near-RT RIC 212 can comprise various rApps, some of which can be directed to interference mitigation, as discussed. For example, non-RT RIC 212 can comprise threshold rApp 214a, slot rApp 214b, and other suitable interference mitigation rApps. Threshold rApp 214a can operate to recommend a threshold update 216a for interference detection that can be used by an associated interference detection xApp 210a. The threshold update 216a can be based on UE data and cell data as further detailed below and can be provided to interference detection xApp 210a as enrichment information.

In instances in which interference is detected (e.g., by threshold rAPP 214a and/or interference detection xApp 210a, slot rApp 214b can recommend slots to be banned for a given cell and a given time slot, via slot recommendation 216b. As is further explained below, such can be based on continuous quality improvement (CQI) scores as well as based on feedback provided from near-RT RIC 202. Slot recommendation 216b can be provided as enrichment information to interference avoidance xApp 210b. It is noted that threshold update 216a and slot recommendation 216b can represent valuable insight for associated interference mitigation xApps, as threshold update 216a and slot recommendation 216b can be based on longer-term trends or patterns than can be exposed by normal operation of interference mitigation xApps 210 that execute on near-RT RIC 202. As such, interference mitigation xApps 210 can potentially operate with significantly improved efficacy.

In more detail, it is appreciated that interference mitigation xApps 210 are generally concerned with the near-real time detection and avoidance of interference, which is typically handled in two phases, namely an interference detection phase, and an interference avoidance phase.

During the interference detection phase, interference detection xApp 210a typically applies an algorithm that relies on machine learning regression problem to predict the signal-to-interference-plus-noise ratio (SINR) for an input reference signal received power (RSRP). Post processing logic can compare the predicted SINR to the actual SINR. If the cosine similarity distance exceeds a certain threshold, then interference is detected.

Based on the manner in which interference detection xApp 210a operates, selection of the threshold can be significant and represent a main part of the detection model. If the threshold is too low, then interference may be predicted when such does not exist. On the other hand, if the threshold is too high, then interference that exists may avoid detection. Both of these situations can lead to negative consequences.

Hence, in order to improve operation of interference detection xApp 210a, threshold rApp 214a can operate to provide threshold update 216a that can represent an improvement over the threshold determined by interference detection xApp 210a. For example, threshold rApp 214a can leverage a statistical approach to periodically recommend a threshold per cell for interference detection based on long-term UE features and aggregated cell load status. In some embodiments, threshold update 216a can be used by interference detection xApp 210a during the post processing step. In some embodiments, threshold update 216a can represent an offset to either increase or decrease the threshold.

By way of illustration, some cells can be more susceptible to external interference, which can be due to geographic location (e.g., proximity to a persistent source of interference). Such cells can have a different threshold relative to other cells to improve the interference detection techniques. Likewise, certain cells can additionally be exposed to interference at certain times (e.g., hours of the day, days of the week, ... ). Therefore, during those times, the threshold can be adjusted differently than other cells to improve the interference detection techniques. Additional detail relating to the interference detection phase is provided in connection with FIGS. 3A and 3B.

During the interference avoidance phase, interference avoidance xApp 210b generally rely on a slot banning approach. For instance, where affected time slots are detected in a short duration based on the number of NACKs reported. To potentially improve operation of interference avoidance xApp 210b, slot rApp 214b can collect statistical data for CQI values reported per time slot, frequency sub bands and some interval (e.g., an hour) of a defined period (e.g., a day or week). Based on this data slot rApp 214b can recommend a highest priority time slot to ban. Furthermore, based on a cell's configuration, the cell can rely on either recommendation for the time slot to ban, that is, the cell can rely on the output of interference avoidance xApp 210b or slot recommendation 216b received from slot rApp 214b.

Figures 3A, 3B:
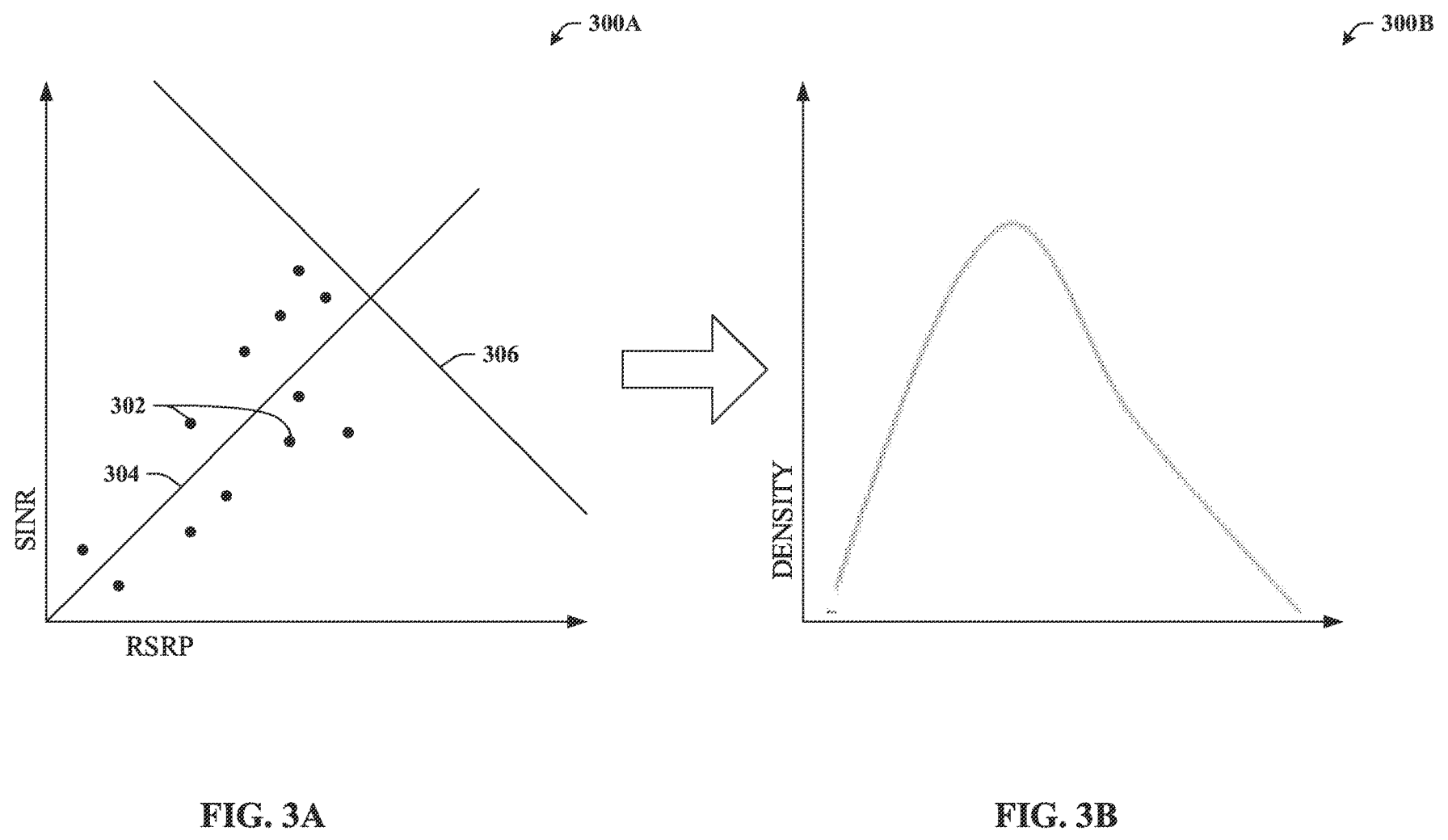

With reference now to FIGS. 3A and 3B, graph 300A is depicted illustrating UE data plotted as a first metric over a second metric and associated Eigenvectors in accordance with certain embodiments of this disclosure and density graph 300B is depicted illustrating an orthogonal projection of the of the UE data projected on one of the Eigenvectors in accordance with certain embodiments of this disclosure. In this example, the first metric is SINR (e.g., y-axis) and the second metric is RSRP (e.g., x-axis). Graph 300A can be associated with techniques or operation associated with threshold rApp 214a, which can be responsible for analyzing a cell state over longer periods of time and recommending updated thresholds for interference detection xApp 210a to in near-RT RIC 202.

As noted previously, interference detection xApp 210a can use a linear regression model to predict the SINR based on the input RSRP. A threshold value in a metric computes the distance between actual samples and predicted samples predicted. Normal samples should have a small distance, while samples suffering interference will have a large distance. Hence, increasing the threshold value allows more samples to be classified as normal. This might be needed for some cells and for specific hours of the week when the cell is loaded and the UE KPI relationships have a large variance.

In these and other suitable case, threshold rApp 214*a* can take a statistical approach to tune the threshold value per cell according to KPIs that are analyzed over a longer term than can be performed by interference detection xApp 210*a*.

For example, threshold rApp 214*a* can subscribe to the appropriate KPIs of a UE for each cell over long periods of time (e.g., days, weeks, months, . . . ). As noted, these subscribed KPIs can be RSRP metrics, SINR metrics, or other suitable metrics. From these subscribed KPIs, threshold rApp 214*a* can calculate Eigenvectors 304 and 306 from the plotted KPI values 302.

Threshold rApp 314*a* can then calculate the variance of the projections of the collected data values 302 onto one of the Eigenvectors, in this case the second Eigenvector 306, which can result in density graph 300B. One motivation for considering the second Eigenvector 306 can be that a large variance of the projected data onto the second Eigenvector 306 can be associated with a higher level of interference in the relationship between RSRP and SINR. Given the definition of SINR (e.g., signal-to-interference-plus-noise ratio), the relationship with RSRP and SINR can be modeled linearly in the absence of interference. Therefore, a positive interference term can break the linearity and deviate more from the expected value.

In more detail, based on the variance calculated, threshold rApp 214*a* can recommend a higher/lower threshold to interference detection xApp 210*a* for each cell, which accommodates for the current traffic pattern. In addition, the recommendation may consider other cell-level KPIs such as cell Physical Resource Block Usage. As the cell load increases, more cell resources will be utilized. Some of these resources might be more susceptible to internal/external interference based on the surrounding conditions.

Accordingly, threshold update 216*a* can be influenced by either or both a UE variance or cell status (e.g., cell load, cell capacity, or the like). In some embodiments, threshold update 216*a* can be determine according to the below or in a similar manner:

$$\text{Threshold}_{New} = \text{Threshold}_{Fixed} \times \left(\frac{\text{Variance}_{New}}{\text{Variance}_{Fixed}}\right) \times \left(\frac{\text{Cell Load}_{New}}{\text{Cell Load}_{Fixed}}\right)$$

The term Threshold$_{New}$ can indicate a value, factor, or component of threshold update 216*a*. In the above, Threshold$_{Fixed}$ can relate to a predetermined fixed value that can be selected based on empirical study. Variance Fixed can be a fixed value obtained that can be the expected variance of the UE KPIs being used. Variance$_{New}$ can represent an updated variance calculated by threshold rApp 214*a*. Cell load$_{Fixed}$ can be a fixed value obtained that can represent the expected cell load of an associated cell. Cell Load$_{New}$ can represent an updated variance calculated by threshold rApp 214*a*.

If UEs are experiencing higher variance in their KPIs compared to a fixed reference (e.g., Variance Fixed), then the ratio will be greater than one, and the threshold update 216*a* will reflect an increase over the original threshold. Accordingly, such can allow a higher tolerance in the associated interference detection xApp 210*a* for predicting normal samples. Such can avoid the situation in which UEs are identified to be behaving differently, since, with the lower threshold, normal UE metrics might otherwise readily be detected as positive interference.

Figure 4:
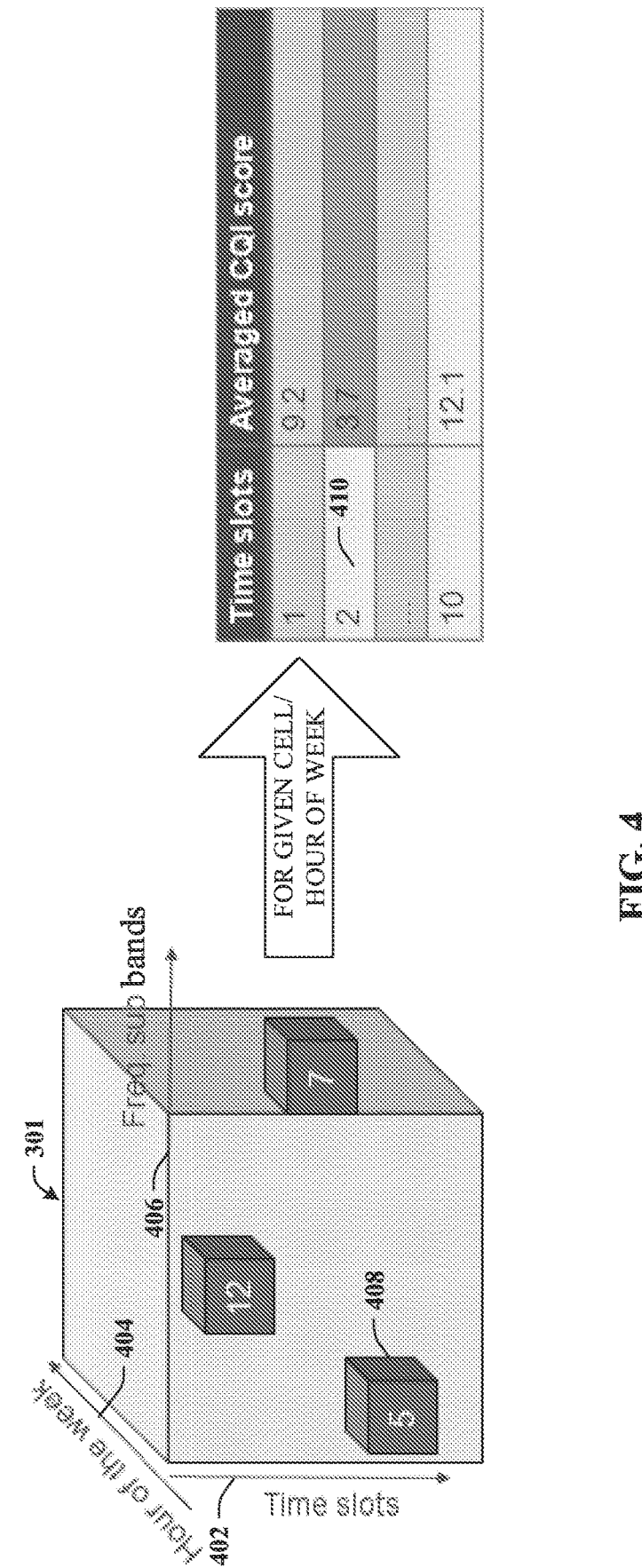
FIG. 4 illustrates a schematic diagram illustrating using average continuous quality improvement (CQI) scores for slot priority or banning in accordance with certain embodiments of this disclosure.

Turning now to FIG. 4, a schematic diagram 400 is depicted illustrating using average CQI scores for slot priority or banning in accordance with certain embodiments of this disclosure. For example, slot rApp 214*b* can collect various information that is illustrated here as a 3-dimensional block. The dimensions used in this illustration are intended to be exemplary. For instance, one dimension can be time slots 402. Another dimension can be an interval of a larger time period, in this case hours (e.g., the interval) of the week (e.g., the larger time period). The third dimension can be for frequency sub bands 406.

Each block 301 can represent CQI averages for a given cell. Block 301 can include component blocks or cubes 408 that correspond to the averaged reported CQI in a specific time slot, sub band, and hour of the week. In other words, the CQI can be averaged for all sub bands over a given hour-long interval for each time slot.

This averaging to determine average CQI scores for a given cube 408 can be performed over several weeks or months to gain insight into long term trends. Once interference is detected by a suitable interference detection xApp 210*a* (possibly with enrichment information received from an associated threshold rApp 214*a*), a suitable interference avoidance xApp 210*b* can send a cell identifier to a statistical block of slot rApp 214*b*.

Based on the current hour of the week and the identified cell, slot rApp 214*b* can calculate a CQI score for each time slot, which can be an associated cube 408. Time slots with CQI scores that are below a certain value or threshold can be recommended to be banned (e.g., via slot recommendation 216*b*). In other embodiments, the lowest CQI score can be selected for banning. For example, as indicated at reference numeral 410, time slot 2 has the lowest CQI score at 3.7, which can be below some defined value or threshold (e.g., below 4.0 or another value).

It is appreciated that slot rApp 216*b* can rely on feedback as well. For example, if affected UE still report NACKs after time slot banning, then interference avoidance xApp 210*b* can update slot rApp 214*b* with the feedback. As one result, the selected time slot average CQI score can be increased by some suitable weighting factor, which can operate to increase the value of the associated CQI score. Hence, a different time slot might then be recommended for banning, since the rank of the time slots by averaged CQI scores can be updated based on this feedback loop.

Figure 5:
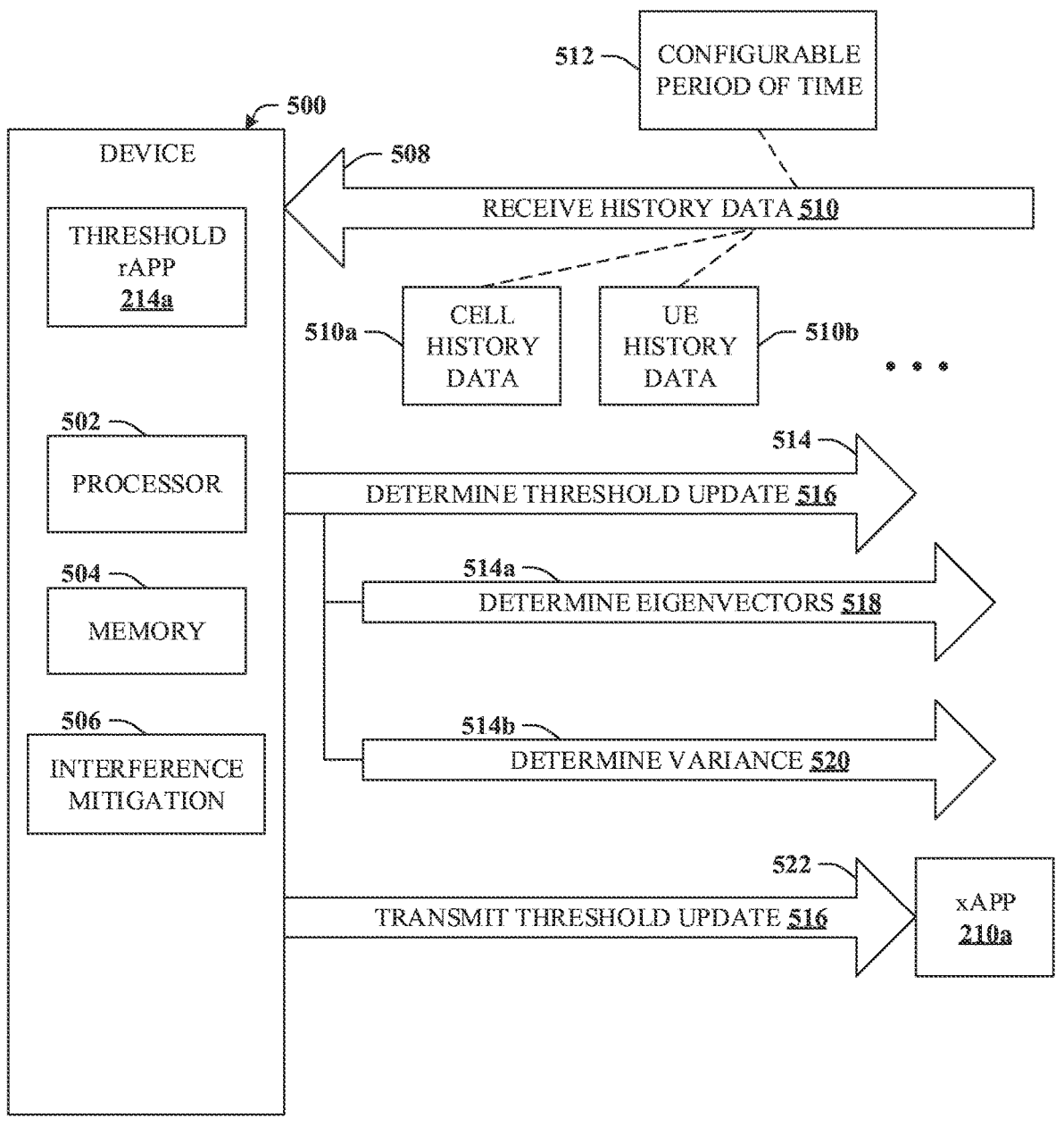
FIG. 5 depicts a schematic block diagram illustrating an example device that can recommend a threshold update to an interference detection xApp in accordance with certain embodiments of this disclosure.

With reference now to FIG. 5, a schematic block diagram is depicted illustrating an example device 500 that can recommend a threshold update to an interference detection xApp in accordance with certain embodiments of this disclosure. In some embodiments, device 500 can be, or can be included in, a non-RT RIC such as non-RT RIC 212. In some embodiments, device 500 can include threshold rApp 214*a*, which can provide updates as enrichment information that is utilized by an xApp 106 executing on near-RT RIC 202.

Device 500 can comprise a processor 502 that, potentially along with interference mitigation device 506, can be specifically configured to perform functions associated with interference mitigation or management. Device 500 can also comprise memory 504 that stores executable instructions that, when executed by processor 502, can facilitate performance of operations. Processor 502 can be a hardware processor having structural elements known to exist in connection with processing units or circuits, with various operations of processor 502 being represented by functional elements shown in the drawings herein that can require special-purpose instructions, for example, stored in memory 504 and/or interference mitigation device 506. Along with these special-purpose instructions, processor 502 and/or interference mitigation device 506 can be a special-purpose device. Further examples of the memory 504 and processor

Figure 11:
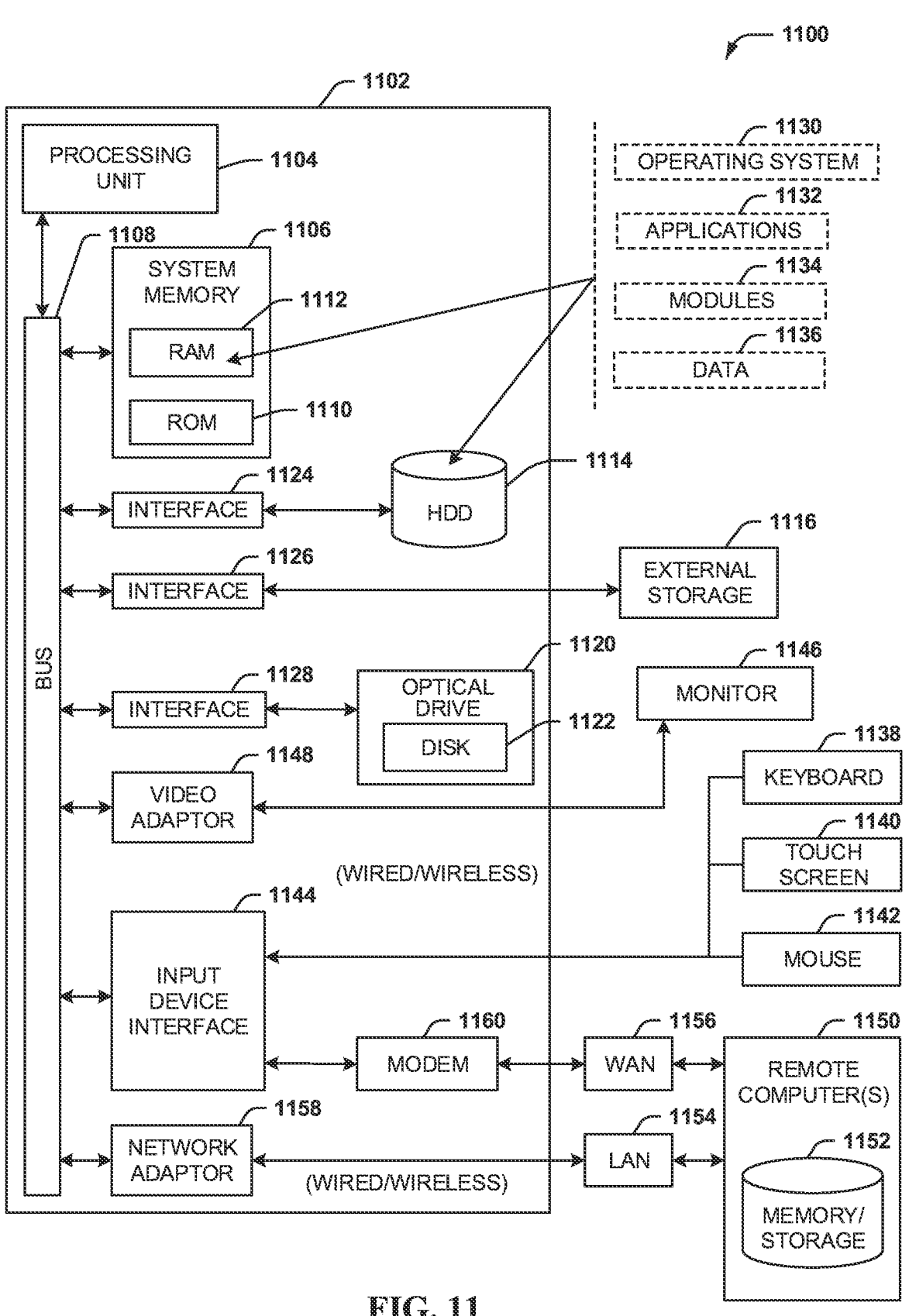
FIG. 11 illustrates an example block diagram of a computer operable to execute certain embodiments of this disclosure.

502 can be found with reference to FIG. 11. It is to be appreciated that device 500 or computer 1102 can represent a server device or a client device of a network or network services platform and can be used in connection with implementing one or more of the systems, devices, or components shown and described in connection with FIG. 5 and other figures disclosed herein.

At reference numeral 508, device 500 can receive history data 510. As previously indicated, history data 510 can comprise cell history data 510*a* indicative of cell status information for a cell. This cell status information can relate, e.g., to a cell load, a cell capacity, or another suitable status indicator. The cell status information can be collected or otherwise relate to a configurable period of time 512 that is greater than one second (e.g., the time range associated with non-RT RICs such as non-RT RIC 212).

For example, the configurable period of time 512 can be a minute, an hour, a day, a week, a month, a year, or another suitable period of time. It is appreciated that configurable time period 512 can be sufficient to establish longer-term trends than can be identified by an interference detection xApp (e.g., interference detection xApp 210*a*), given the xApp executes on a near-RT RIC that has rigid response time constraints between 10 milliseconds and 1 second and therefore, is not suitable for analyzing data more than 1 second old. In some embodiments, configurable period of time 512 can be selected based on factors associated with a given cell or group of cells. Thus, cells that are situated in urban environments may have a lower value for the configurable period of time 512 than those in rural environments as one example.

Likewise, history data 510 can include UE history data 510*b*. UE history data 510*b* can be indicative of UE measurement reported to the cell over at least a portion of configurable time period 512. For example, the UE measurement reported can relate to a SINR metric, a RSRP metric, or another suitable metric, including a CQI metric that can be utilized in connection with rApp 214*b*, which is further detailed with reference to FIG. 7.

At reference numeral 514, device 500 can determine threshold update 516. Threshold update 516 can be based on history data 510 and can be similar to that described in connection with threshold update 216*a* of FIG. 2. As noted, threshold update 516 can be specifically designed to update a threshold determined or used by an associated interference detection xApp that executes on near-RT RIC 202.

In some embodiments, in connection with determining threshold update 516, device 500 can determine Eigenvectors 518 from at least two metrics of UE history data 510*b*. As a representative example, the at least two metrics can be SINR and RSRP and Eigenvectors 518 can comprise first Eigenvector 304 and second Eigenvector 306, as discussed in connection with FIG. 3.

In some embodiments, also in connection with determining threshold update 516, device 500 can determine variance 520. Variance 520 can be indicative of a variance between the UE measurement (e.g., SINR/RSRP) and a predicted value indicated by one of the at least two Eigenvectors 518.

Hence, in some embodiments, threshold update 516 can be determined as a function of variance 520 over configurable period of time 512 and a cell status over the configurable period of time 512. Thus, in some embodiments, threshold update 512 can represent an increase or a decrease to a threshold determined by an associated interference detection xApp based on an amount of variance 520 determined by threshold rApp 214*a*.

At reference numeral 522, device 500 can transmit threshold update 516 to an associated interference detection xApp 210*a* and/or the near-RT RIC. As previously explained, such can be transmitted as enrichment information in accordance with ORAN specifications.

Figure 6:
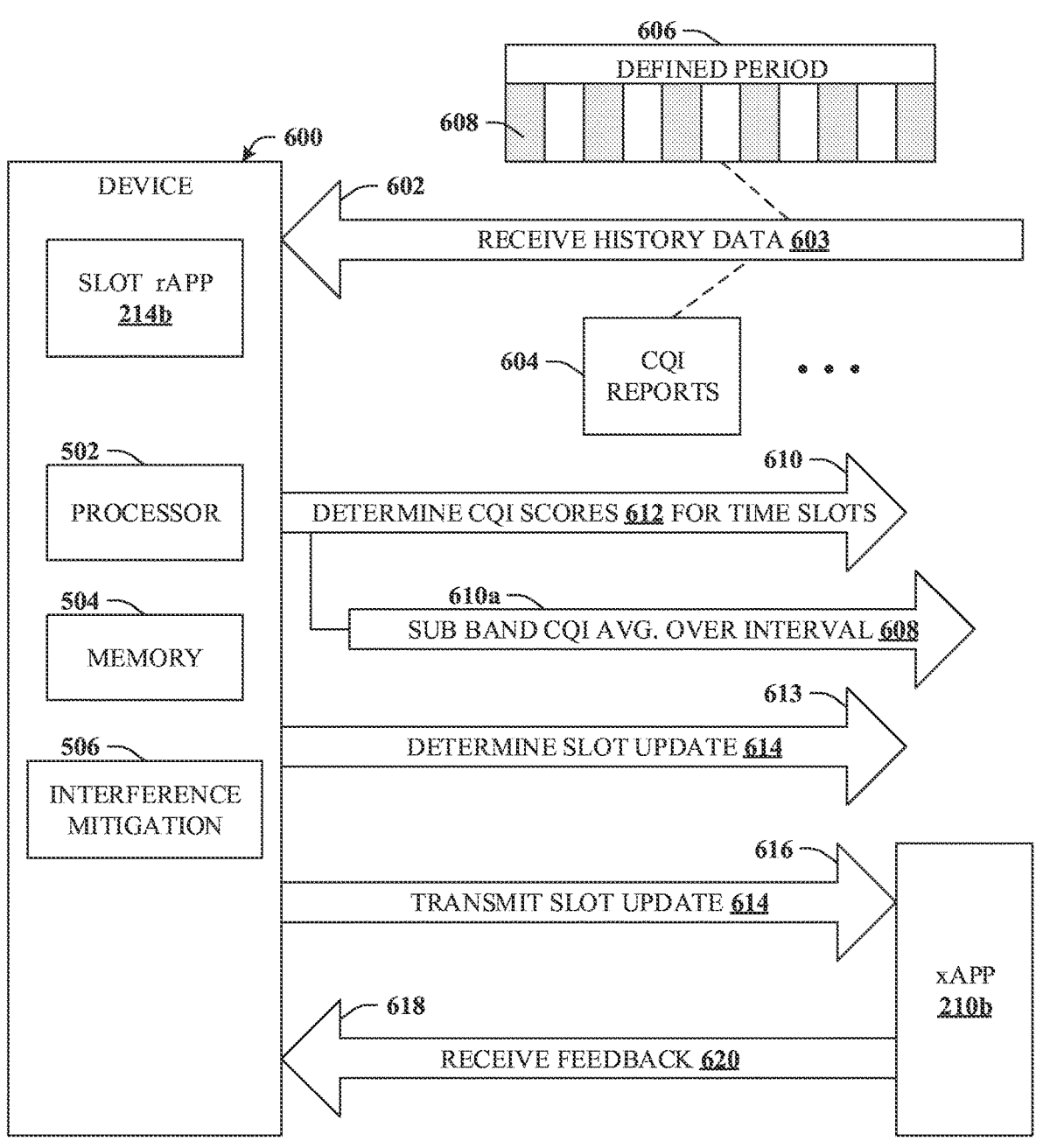
FIG. 6 depicts a schematic block diagram illustrating an example device that can recommend a slot to ban update to a scheduler or an interference avoidance xApp in accordance with certain embodiments of this disclosure.

With reference now to FIG. 6, a schematic block diagram is depicted illustrating an example device 600 that can recommend a slot to ban update to a scheduler or an interference avoidance xApp in accordance with certain embodiments of this disclosure. In some embodiments, device 500 can be, or can be included in, a non-RT RIC such as non-RT RIC 212. In some embodiments, device 500 can include slot rApp 214*b*, which can provide updates as enrichment information that is utilized by an xApp 106 executing on near-RT RIC 202.

Device 600 can comprise a processor 502 and memory 504 as detailed in connection with FIG. 5. In some embodiments, device 600 can be, or can be included in, a non-RT RIC such as non-RT RIC 212. In some embodiments, device 600 can include all or a portion of device 500 detailed in connection with FIG. 5.

At reference numeral 602, device 600 can receive history data 603. History data 603 can comprise CQI reports 604 that are indicative of UE CQI measurements over an interval 608 (e.g., an hour) of a defined period 606 (e.g., a week). In some embodiments, history data 603 can comprise history data 510 detailed in connection with FIG. 5.

At reference numeral 610, device 600 and/or slot rApp 214*b* can determine respective CQI scores 612 for respective time slots. An example CQI score 612 can be indicative of measured CQIs across different frequency sub bands over a given interval 608. In some embodiments, a given CQI score 612 can be the same or similar as that described in connection with cubes 408 of FIG. 4.

Hence, as illustrated at reference numeral 610*a*, device 600 and/or slot rApp 214*b* can determine CQI score 612 by averaging all sub band frequencies during a given hour of time (e.g., interval 608) for each time slot.

At reference numeral 613, device 600 and/or slot rApp 214*b* can determine slot update 614. Slot update 614 can be substantially the same or similar to slot update 216*b* detailed in connection with FIG. 2. Slot update 614 can be determined as a function of CQI scores 612 determined in connection with reference numeral 610. For example, time slots with the lowest CQI scores 612 or time slots having CQI scores 612 that are lower than a defined value or threshold can be recommended for banning.

At reference numeral 616, device 600 can transmit slot update 614 to an associated xApp executing on a near-RT RIC, such as interference avoidance xApp 210*b*. In other embodiments, slot update 614 can in addition or alternatively be provided to a scheduler. In some embodiments, the scheduler can determine whether to use slot update 614 from rApp 214*b* or a slot update from the interference avoidance xApp 210*b*, which may yield a different result.

At reference numeral 618, device 600 can receive feedback 620 from interference avoidance xApp 210*b*. In some embodiments, feedback 620 can take the form of hybrid automatic repeat requests (HARQs). For example, interference avoidance xApp 210*b* can subscribe to UE HARQ data and forward relevant data to device 600 and/or slot rApp 214*b*. As discussed in connection with FIG. 4, feedback 620 can be utilized so that a selected time slot average CQI score can be increased by some suitable weighting factor, which can operate to increase the value of the associated CQI score. Upon subsequent iterations, a different time slot might be recommended for banning based on feedback.

Example Methods

Figure 7:
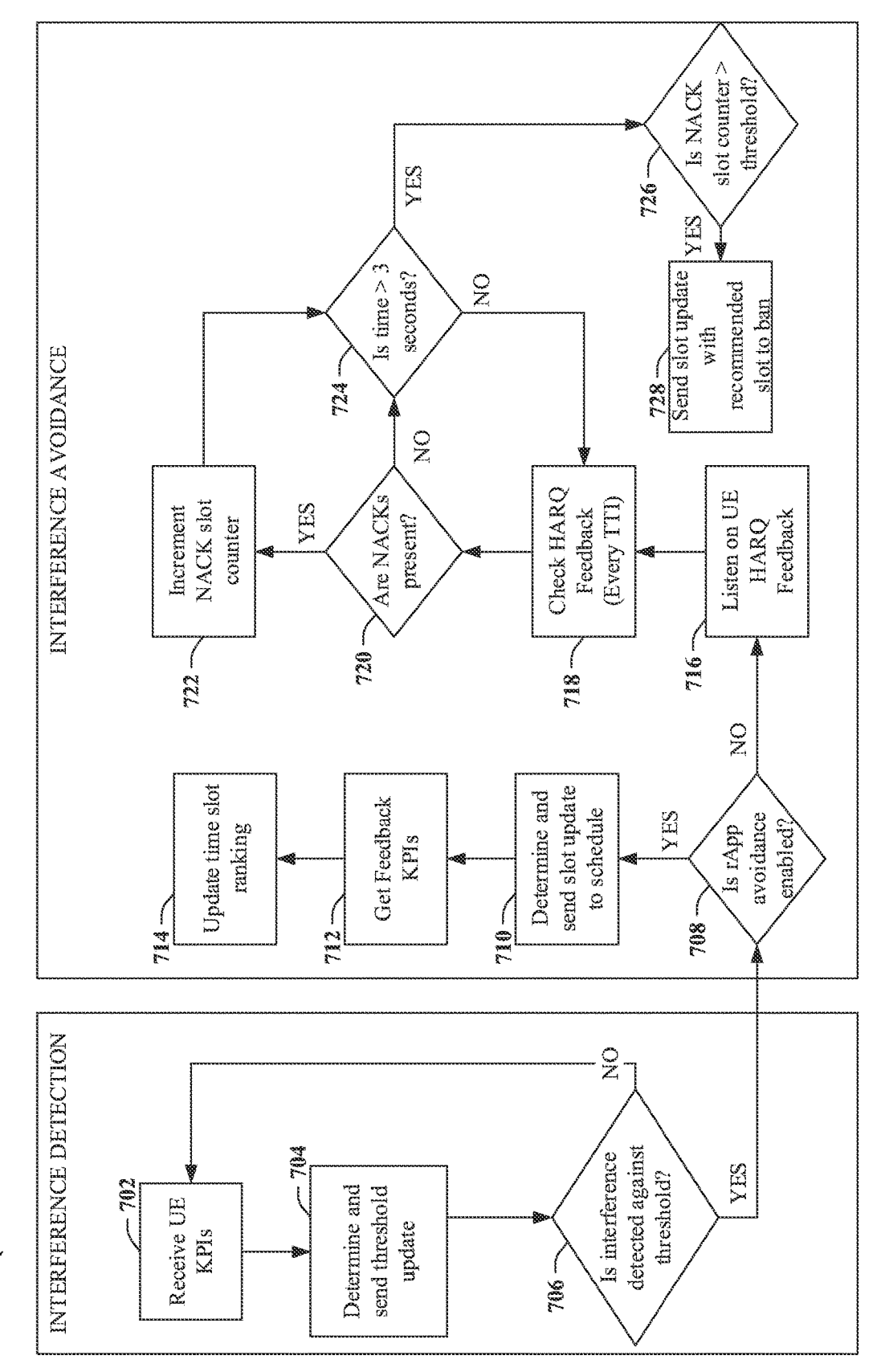
FIG. 7 illustrates an example method that can provide for interference mitigation, including interference detection and interference avoidance by updating associated xApps with rApp output in accordance with certain embodiments of this disclosure.
Figure 9:
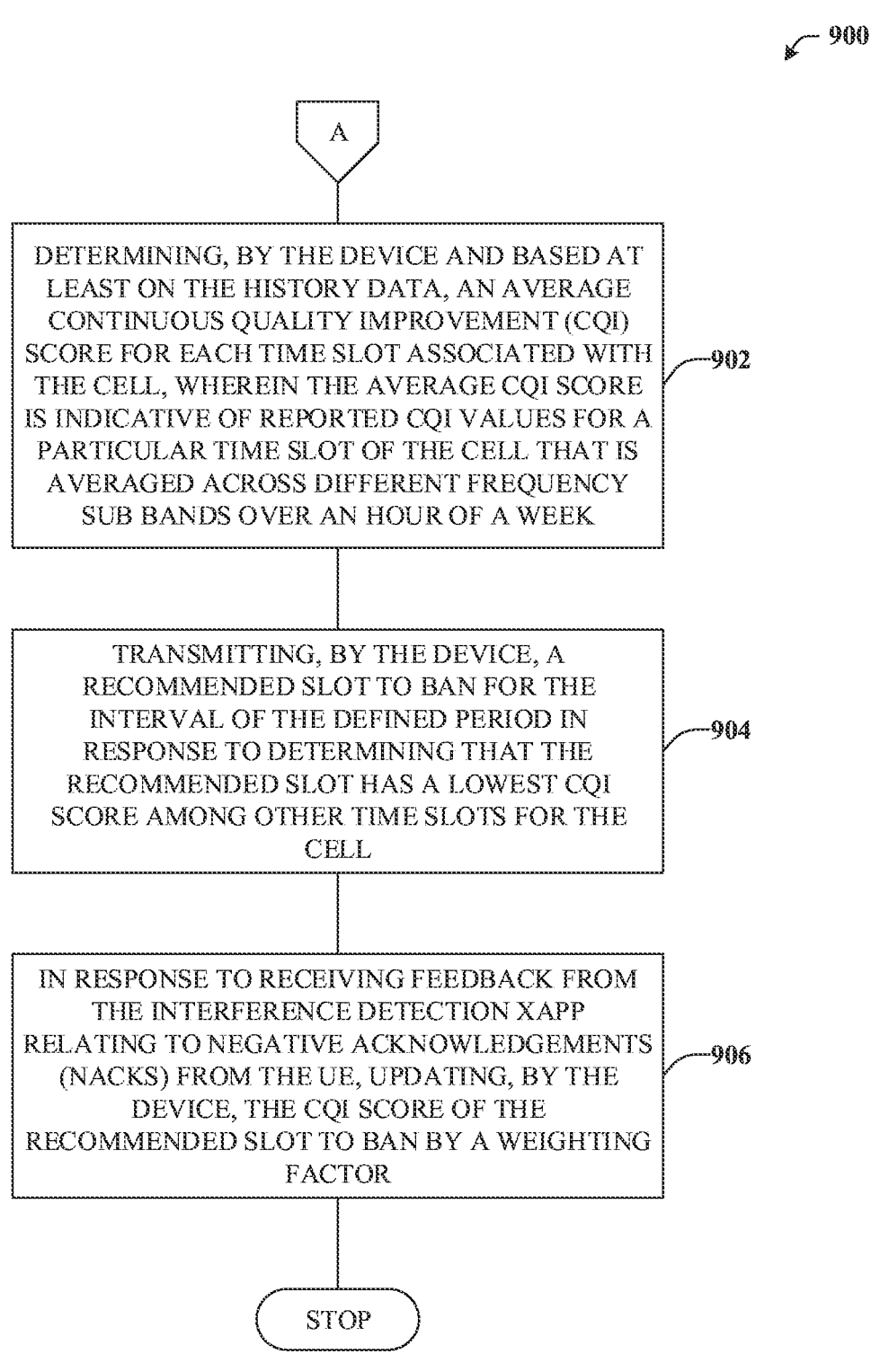
FIG. 9 illustrates an example method that can provide for additional aspect or elements in connection with utilizing interference mitigation rApps to update or improve operation of interference detection xApps in accordance with certain embodiments of this disclosure.

FIGS. 7-9 illustrate various methods in accordance with the disclosed subject matter. While, for purposes of simplicity of explanation, the methods are shown and described as a series of acts, it is to be understood and appreciated that the disclosed subject matter is not limited by the order of acts, as some acts may occur in different orders and/or concurrently with other acts from that shown and described herein. For example, those skilled in the art will understand and appreciate that a method could alternatively be represented as a series of interrelated states or events, such as in a state diagram. Moreover, not all illustrated acts may be required to implement a method in accordance with the disclosed subject matter. Additionally, it should be further appreciated that the methods disclosed hereinafter and throughout this specification are capable of being stored on an article of manufacture to facilitate transporting and transferring such methods to computers.

Turning now to FIG. 7, exemplary method 700 is depicted. Method 700 can provide for interference mitigation, including interference detection and interference avoidance by updating associated xApps with rApp output in accordance with certain embodiments of this disclosure. Method 700 is intended to illustrate one end-to-end example demonstrating functionality of both rApps and xApps as it relates to both interference detection and interference avoidance.

For example, at process block 702, an rApp (e.g., threshold rApp 210a) or another suitable device (e.g., device 500) can receive UE KPIs such as, for example, SINR and RSRP. Based on the received KPIs, at process block 704, the rApp or device can determine a threshold update (e.g., threshold update 216a) and transmit the threshold update to an associate xApp (e.g., interference detection xApp 210a).

At decision block 706, the interference detection xApp can determine whether interference is detected against the threshold previously applied. Such can be accomplished via analysis of NACKs associated with affected UE or another suitable manner. If no, then method 700 can terminate or loop back to process block 702, where further interference detection activity can occur. Otherwise, if yes, then method 700 can proceed to the interference avoidance portion.

In that case, at decision block 708, the same or a different rApp (e.g., slot rApp 210b) or device (e.g., device 600) can determine whether rApp-based interference avoidance is enabled. If yes, then method 700 can proceed to process block 710. In no, then method 700 can proceed to process block 716.

At process block 710, the rApp or device can determine slot update (e.g., slot update 216b) that indicates a recommended slot to ban, and transmit the slot update to an associated xApp (e.g., interference avoidance xApp 210b) or to a scheduler.

At process block 712, the rApp or device can get feedback KPIs. For example, an rApp can listen on a UE quality feedback KPI channel or the like. Based on this feedback, at process block 714, the rApp or device can update time slot rankings (e.g., CQI scores) accordingly.

If rApp interference avoidance is not enabled, the such can indicate that a scheduler or an associated interference avoidance xApp are not to be updated with the slot rApp output. In that case, method 700 proceeds to process block 716, in which the interference avoidance xApp can operate normally (e.g., without enrichment information from the rApp). At process block 716, the xApp can listen on UE HARQ feedback channels.

At process block 718, the xApp can check HARQ feedback (e.g., called every transmission time interval (TTI)). At decision block 720, a check for whether NACKs are occurring can be made. If yes, then method 700 can proceed to process block 722. Otherwise, if no, then method 700 can proceed to decision block 724.

At process block 722, the xApp can increment a NACK slot counter and then proceed to decision block 724. At decision block 724, the xApp can test whether a time is greater than three seconds or another suitable time. If no, then method 700 can loop back to process block 718. Otherwise, if yes, the method 700 can proceed to decision block 726.

At decision block 726, the xApp can check whether a given NACK slot counter is greater than a given threshold. If no, then method 700 can terminate or loop back to another suitable element such as process block 702. If yes, then method 700 can proceed to process block 728, where the xApp can send slot updates with a recommended slot to ban.

Referring now to FIG. 8, exemplary method 800 is depicted. Method 800 can utilize interference mitigation rApps to update or improve operation of interference detection xApps in accordance with certain embodiments of this disclosure. While method 800 describes a complete method, in some embodiments, method 800 can include one or more elements of method 900, as illustrated by insert A.

At reference numeral 802, a device comprising a processor can receive history data. The history data can comprise cell history data indicative of cell status information for a cell over a configurable period of time greater than one second. For example, cell history data can represent a cell load or cell capacity over the configurable period of time, or another suitable metric or indicator. The history data can further comprise user equipment (UE) history data indicative of UE measurements reported to the cell over at least a portion of the configurable period of time. For example, the UE history data can be indicative of a SINR metric, and RSRP metric, a CQI metric, or another suitable metric or KPI associated with the UE or another portion of the RAN.

At reference numeral 804, the device can determine a threshold update based on the history data. The threshold update can represent an update for a threshold determined by an interference detection xApp executing on a near-real time radio access network intelligent controller (near-RT RIC). As explained herein, the xApp may not be capable of discovering long term trends or patterns that can affect interference. Hence, the threshold update, e.g., from an rApp that has the capability to recognize long term trends or patters can significantly improve suitable threshold selection.

At reference numeral 806, the device can transmit the threshold update to the interference detection xApp. Method 800 can terminate in some embodiments, or proceed to insert A in other embodiments, which is further detailed in connection with FIG. 9.

Turning now to FIG. 9, exemplary method 900 is depicted. Method 900 can provide for additional aspect or elements in connection with utilizing interference mitigation rApps to update or improve operation of interference detection xApps in accordance with certain embodiments of this disclosure. For example, while method 800 can provide rApp threshold updates, method 900 can relate to rApp slot recommendations.

For example, at reference numeral 902, the device introduced at reference numeral 802 comprising a processor can, determine an average continuous quality improvement (CQI) score for each time slot associated with the cell. The average CQI score can indicative of reported CQI values for a particular time slot of the cell that is averaged across different frequency sub bands over an hour of a week. It is appreciated that in other embodiments, the average CQI score can be averaged over a different interval and/or time period, such as a 10 minute window of day or the like. Thus, the interval (e.g., hour) of the time period (e.g., week) can be configurable based on implementation or use cases.

At reference numeral 904, the device can transmit a recommended slot to ban for the interval of the defined period in response to determining that the recommended slot has a lowest CQI score among other time slots for the cell.

At reference numeral 906, the device can update the CQI score of the recommended slot to ban by a weighting factor in response to receiving, from the interference detection xApp, feedback relating to negative acknowledgements (NACKs) from the UE. After this update, the device can recommend a different time slot to ban due to the associated changes.

Example Operating Environments

Figure 10:
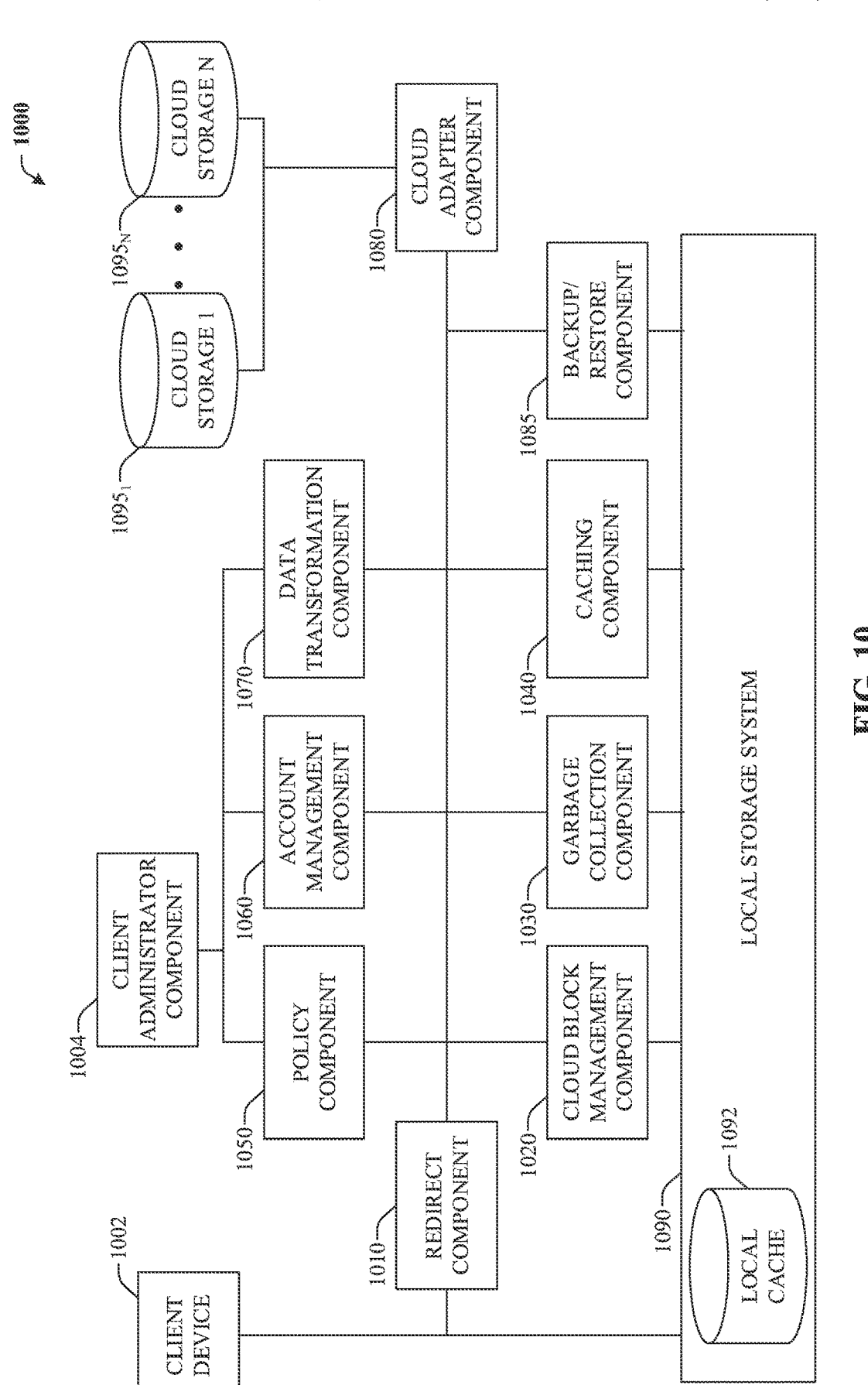
FIG. 10 illustrates a block diagram of an example distributed file storage system that employs tiered cloud storage in accordance with certain embodiments of this disclosure.

To provide further context for various aspects of the subject specification, FIGS. 10 and 11 illustrate, respectively, a block diagram of an example distributed file storage system 1000 that employs tiered cloud storage and block diagram of a computer 1102 operable to execute the disclosed storage architecture in accordance with aspects described herein.

Referring now to FIG. 10, there is illustrated an example local storage system including cloud tiering components and a cloud storage location in accordance with implementations of this disclosure. Client device 1002 can access local storage system 1090. Local storage system 1090 can be a node and cluster storage system such as an EMC Isilon Cluster that operates under OneFS operating system. Local storage system 1090 can also store the local cache 1092 for access by other components. It can be appreciated that the systems and methods described herein can run in tandem with other local storage systems as well.

As more fully described below with respect to redirect component 1010, redirect component 1010 can intercept operations directed to stub files. Cloud block management component 1020, garbage collection component 1030, and caching component 1040 may also be in communication with local storage system 1090 directly as depicted in FIG. 10 or through redirect component 1010. A client administrator component 1004 may use an interface to access the policy component 1050 and the account management component 1060 for operations as more fully described below with respect to these components. Data transformation component 1070 can operate to provide encryption and compression to files tiered to cloud storage. Cloud adapter component 1080 can be in communication with cloud storage 1 1095₁ and cloud storage N 1095_N, where N is a positive integer. It can be appreciated that multiple cloud storage locations can be used for storage including multiple accounts within a single cloud storage location as more fully described in implementations of this disclosure. Further, a backup/restore component 1085 can be utilized to back up the files stored within the local storage system 1090.

Cloud block management component 1020 manages the mapping between stub files and cloud objects, the allocation of cloud objects for stubbing, and locating cloud objects for recall and/or reads and writes. It can be appreciated that as file content data is moved to cloud storage, metadata relating to the file, for example, the complete inode and extended attributes of the file, still are stored locally, as a stub. In one implementation, metadata relating to the file can also be stored in cloud storage for use, for example, in a disaster recovery scenario.

Mapping between a stub file and a set of cloud objects models the link between a local file (e.g., a file location, offset, range, etc.) and a set of cloud objects where individual cloud objects can be defined by at least an account, a container, and an object identifier. The mapping information (e.g., mapinfo) can be stored as an extended attribute directly in the file. It can be appreciated that in some operating system environments, the extended attribute field can have size limitations. For example, in one implementation, the extended attribute for a file is 8 kilobytes. In one implementation, when the mapping information grows larger than the extended attribute field provides, overflow mapping information can be stored in a separate system b-tree. For example, when a stub file is modified in different parts of the file, and the changes are written back in different times, the mapping associated with the file may grow. It can be appreciated that having to reference a set of non-sequential cloud objects that have individual mapping information rather than referencing a set of sequential cloud objects, can increase the size of the mapping information stored. In one implementation, the use of the overflow system b-tree can limit the use of the overflow to large stub files that are modified in different regions of the file.

File content can be mapped by the cloud block management component 1020 in chunks of data. A uniform chunk size can be selected where all files that are tiered to cloud storage can be broken down into chunks and stored as individual cloud objects per chunk. It can be appreciated that a large chunk size can reduce the number of objects used to represent a file in cloud storage; however, a large chunk size can decrease the performance of random writes.

The account management component 1060 manages the information for cloud storage accounts. Account information can be populated manually via a user interface provided to a user or administrator of the system. Each account can be associated with account details such as an account name, a cloud storage provider, a uniform resource locator ("URL"), an access key, a creation date, statistics associated with usage of the account, an account capacity, and an amount of available capacity. Statistics associated with usage of the account can be updated by the cloud block management component 1020 based on list of mappings it manages. For example, each stub can be associated with an account, and the cloud block management component 1020 can aggregate information from a set of stubs associated with the same account. Other example statistics that can be maintained include the number of recalls, the number of writes, the number of modifications, and the largest recall by read and write operations, etc. In one implementation, multiple accounts can exist for a single cloud service provider, each with unique account names and access codes.

The cloud adapter component 1080 manages the sending and receiving of data to and from the cloud service providers. The cloud adapter component 1080 can utilize a set of APIs. For example, each cloud service provider may have provider specific API to interact with the provider.

A policy component 1050 enables a set of policies that aid a user of the system to identify files eligible for being tiered to cloud storage. A policy can use criteria such as file name, file path, file size, file attributes including user generated file attributes, last modified time, last access time, last status change, and file ownership. It can be appreciated that other file attributes not given as examples can be used to establish tiering policies, including custom attributes specifically designed for such purpose. In one implementation, a policy can be established based on a file being greater than a file size threshold and the last access time being greater than a time threshold.

In one implementation, a policy can specify the following criteria: stubbing criteria, cloud account priorities, encryption options, compression options, caching and IO access pattern recognition, and retention settings. For example, user selected retention policies can be honored by garbage collection component 1030. In another example, caching policies such as those that direct the amount of data cached for a stub (e.g., full vs. partial cache), a cache expiration period (e.g., a time period where after expiration, data in the cache is no longer valid), a write back settle time (e.g., a time period of delay for further operations on a cache region to guarantee any previous writebacks to cloud storage have settled prior to modifying data in the local cache), a delayed invalidation period (e.g., a time period specifying a delay until a cached region is invalidated thus retaining data for backup or emergency retention), a garbage collection retention period, backup retention periods including short term and long term retention periods, etc.

A garbage collection component 1030 can be used to determine which files/objects/data constructs remaining in both local storage and cloud storage can be deleted. In one implementation, the resources to be managed for garbage collection include CMOs, cloud data objects (CDOs) (e.g., a cloud object containing the actual tiered content data), local cache data, and cache state information.

A caching component 1040 can be used to facilitate efficient caching of data to help reduce the bandwidth cost of repeated reads and writes to the same portion (e.g., chunk or sub-chunk) of a stubbed file, can increase the performance of the write operation, and can increase performance of read operations to portion of a stubbed file accessed repeatedly. As stated above with regards to the cloud block management component 1020, files that are tiered are split into chunks and in some implementations, sub chunks. Thus, a stub file or a secondary data structure can be maintained to store states of each chunk or sub-chunk of a stubbed file. States (e.g., stored in the stub as cacheinfo) can include a cached data state meaning that an exact copy of the data in cloud storage is stored in local cache storage, a non-cached state meaning that the data for a chunk or over a range of chunks and/or sub chunks is not cached and therefore the data has to be obtained from the cloud storage provider, a modified state or dirty state meaning that the data in the range has been modified, but the modified data has not yet been synched to cloud storage, a sync-in-progress state that indicates that the dirty data within the cache is in the process of being synced back to the cloud and a truncated state meaning that the data in the range has been explicitly truncated by a user. In one implementation, a fully cached state can be flagged in the stub associated with the file signifying that all data associated with the stub is present in local storage. This flag can occur outside the cache tracking tree in the stub file (e.g., stored in the stub file as cacheinfo), and can allow, in one example, reads to be directly served locally without looking to the cache tracking tree.

The caching component 1040 can be used to perform at least the following seven operations: cache initialization, cache destruction, removing cached data, adding existing file information to the cache, adding new file information to the cache, reading information from the cache, updating existing file information to the cache, and truncating the cache due to a file operation. It can be appreciated that besides the initialization and destruction of the cache, the remaining five operations can be represented by four basic file system operations: Fill, Write, Clear and Sync. For example, removing cached data is represented by clear, adding existing file information to the cache by fill, adding new information to the cache by write, reading information from the cache by read following a fill, updating existing file information to the cache by fill followed by a write, and truncating cache due to file operation by sync and then a partial clear.

In one implementation, the caching component 1040 can track any operations performed on the cache. For example, any operation touching the cache can be added to a queue prior to the corresponding operation being performed on the cache. For example, before a fill operation, an entry is placed on an invalidate queue as the file and/or regions of the file will be transitioning from an uncached state to cached state. In another example, before a write operation, an entry is placed on a synchronization list as the file and/or regions of the file will be transitioning from cached to cached-dirty. A flag can be associated with the file and/or regions of the file to show that it has been placed in a queue and the flag can be cleared upon successfully completing the queue process.

In one implementation, a time stamp can be utilized for an operation along with a custom settle time depending on the operations. The settle time can instruct the system how long to wait before allowing a second operation on a file and/or file region. For example, if the file is written to cache and a write back entry is also received, by using settle times, the write back can be re-queued rather than processed if the operation is attempted to be performed prior to the expiration of the settle time.

In one implementation, a cache tracking file can be generated and associated with a stub file at the time it is tiered to the cloud. The cache tracking file can track locks on the entire file and/or regions of the file and the cache state of regions of the file. In one implementation, the cache tracking file is stored in an Alternate Data Stream ("ADS"). It can be appreciated that ADS are based on the New Technology File System ("NTFS") ADS. In one implementation, the cache tracking tree tracks file regions of the stub file, cached states associated with regions of the stub file, a set of cache flags, a version, a file size, a region size, a data offset, a last region, and a range map.

In one implementation, a cache fill operation can be processed by the following steps: (1) an exclusive lock on can be activated on the cache tracking tree; (2) it can be verified whether the regions to be filled are dirty; (3) the exclusive lock on the cache tracking tree can be downgraded to a shared lock; (4) a shared lock can be activated for the cache region; (5) data can be read from the cloud into the cache region; (6) update the cache state for the cache region to cached; and (7) locks can be released.

In one implementation, a cache read operation can be processed by the following steps: (1) a shared lock on the cache tracking tree can be activated; (2) a shared lock on the cache region for the read can be activated; (3) the cache tracking tree can be used to verify that the cache state for the cache region is not "not cached;" (4) data can be read from the cache region; (5) the shared lock on the cache region can be deactivated; (6) the shared lock on the cache tracking tree can be deactivated.

In one implementation, a cache write operation can be processed by the following steps: (1) an exclusive lock on can be activated on the cache tracking tree; (2) the file can be added to the synch queue; (3) if the file size of the write is greater than the current file size, the cache range for the file can be extended; (4) the exclusive lock on the cache tracking tree can be downgraded to a shared lock; (5) an exclusive lock can be activated on the cache region; (6) if the cache tracking tree marks the cache region as "not cached" the region can be filled; (7) the cache tracking tree can be updated to mark the cache region as dirty; (8) the data can be written to the cache region; (9) the lock can be deactivated.

In one implementation, data can be cached at the time of a first read. For example, if the state associated with the data range called for in a read operation is non-cached, then this would be deemed a first read, and the data can be retrieved from the cloud storage provider and stored into local cache. In one implementation, a policy can be established for populating the cache with range of data based on how frequently the data range is read; thus, increasing the likelihood that a read request will be associated with a data range in a cached data state. It can be appreciated that limits on the size of the cache, and the amount of data in the cache can be limiting factors in the amount of data populated in the cache via policy.

A data transformation component 1070 can encrypt and/or compress data that is tiered to cloud storage. In relation to encryption, it can be appreciated that when data is stored in off-premises cloud storage and/or public cloud storage, users can require data encryption to ensure data is not disclosed to an illegitimate third party. In one implementation, data can be encrypted locally before storing/writing the data to cloud storage.

In one implementation, the backup/restore component 1085 can transfer a copy of the files within the local storage system 1090 to another cluster (e.g., target cluster). Further, the backup/restore component 1085 can manage synchronization between the local storage system 1090 and the other cluster, such that, the other cluster is timely updated with new and/or modified content within the local storage system 1090.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), one or more external storage devices 1116 (e.g., a magnetic floppy disk drive (FDD) 1116, a memory stick or flash drive reader, a memory card reader, etc.) and an optical disk drive 1120 (e.g., which can read or write from a CD-ROM disc, a DVD, a BD, etc.). While the internal HDD 1114 is illustrated as located within the computer 1102, the internal HDD 1114 can also be configured for external use in a suitable chassis (not shown). Additionally, while not shown in environment 1100, a solid state drive (SSD) could be used in addition to, or in place of, an HDD 1114. The HDD 1114, external storage device(s) 1116 and optical disk drive 1120 can be connected to the system bus 1108 by an HDD interface 1124, an external storage interface 1126 and an optical drive interface 1128, respectively. The interface 1124 for external drive implementations can include at least one or both of Universal Serial Bus (USB) and Institute of Electrical and Electronics Engineers (IEEE) 1194 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

Computer 1102 can optionally comprise emulation technologies. For example, a hypervisor (not shown) or other intermediary can emulate a hardware environment for operating system 1130, and the emulated hardware can optionally be different from the hardware illustrated in FIG. 11. In such an embodiment, operating system 1130 can comprise one virtual machine (VM) of multiple VMs hosted at computer 1102. Furthermore, operating system 1130 can provide runtime environments, such as the Java runtime environment or the .NET framework, for applications 1132. Runtime environments are consistent execution environments that allow applications 1132 to run on any operating system that includes the runtime environment. Similarly, operating system 1130 can support containers, and applications 1132 can be in the form of containers, which are lightweight, standalone, executable packages of software that include, e.g., code, runtime, system tools, system libraries and settings for an application.

Further, computer 1102 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1102, e.g., applied at the application execution level or at the operating system (OS) kernel level, thereby enabling security at any level of code execution.

A user can enter commands and information into the computer 1102 through one or more wired/wireless input devices, e.g., a keyboard 1138, a touch screen 1140, and a pointing device, such as a mouse 1142. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1104 through an input device interface 1144 that can be coupled to the system bus 1108, but can be connected by other interfaces, such as a parallel port, an IEEE 1194 serial port, a game port, a USB port, an IR interface, a BLUETOOTH® interface, etc.

A monitor 1146 or other type of display device can be also connected to the system bus 1108 via an interface, such as a video adapter 1148. In addition to the monitor 1146, a computer typically includes other peripheral output devices (not shown), such as speakers, printers, etc.

The computer 1102 can operate in a networked environment using logical connections via wired and/or wireless communications to one or more remote computers, such as a remote computer(s) 1150. The remote computer(s) 1150 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1152 is illustrated. The logical connections depicted include wired/wireless connectivity to a local area network (LAN) 1154 and/or larger networks, e.g., a wide area network (WAN) 1156. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1154 through a wired and/or wireless communication network interface or adapter 1158. The adapter 1158 can facilitate wired or wireless communication to the LAN 1154, which can also include a wireless access point (AP) disposed thereon for communicating with the adapter 1158 in a wireless mode.

When used in a WAN networking environment, the computer 1102 can include a modem 1160 or can be connected to a communications server on the WAN 1156 via other means for establishing communications over the WAN 1156, such as by way of the Internet. The modem 1160, which can be internal or external and a wired or wireless device, can be connected to the system bus 1108 via the input device interface 1144. In a networked environment, program modules depicted relative to the computer 1102 or portions thereof, can be stored in the remote memory/storage device 1152. It will be appreciated that the network connections shown are example and other means of establishing a communications link between the computers can be used.

When used in either a LAN or WAN networking environment, the computer 1102 can access cloud storage systems or other network-based storage systems in addition to, or in place of, external storage devices 1116 as described above. Generally, a connection between the computer 1102 and a cloud storage system can be established over a LAN 1154 or WAN 1156 e.g., by the adapter 1158 or modem 1160, respectively. Upon connecting the computer 1102 to an associated cloud storage system, the external storage interface 1126 can, with the aid of the adapter 1158 and/or modem 1160, manage storage provided by the cloud storage system as it would other types of external storage. For instance, the external storage interface 1126 can be configured to provide access to cloud storage sources as if those sources were physically connected to the computer 1102.

The computer 1402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 1102.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 5 GHz radio band at a 54 Mbps (802.11a) data rate, and/or a 2.4 GHz radio band at an 11 Mbps (802.11b), a 54 Mbps (802.11g) data rate, or up to a 600 Mbps (802.11n) data rate for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. In an aspect, when a processor executes instructions to perform "operations", this could include the processor performing the operations directly and/or facilitating, directing, or cooperating with another device or component to perform the operations.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component.

One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A device, comprising:
at least one processor; and
at least one memory that stores executable instructions that, when executed by the at least one processor, facilitate performance of operations, comprising:
receiving, via a threshold rApp of a non-real time radio access network intelligent controller (non-RT RIC), history data comprising cell history data indicative of cell status information for a cell over a configurable period of time greater than one second and user equipment (UE) history data indicative of UE measurements reported to the cell over at least a portion of the configurable period of time;
based on at least the history data, determining, via the threshold rApp, a threshold update for a threshold determined by an interference detection xApp executing on a near-real time radio access network intelligent controller (near-RT RIC); and
transmitting the threshold update to the interference detection xApp,
wherein the determining of the threshold update comprises determining at least two Eigenvectors from at least two metrics of the UE history data.

2. The device of claim 1, wherein the cell status information comprises a cell load metric or a cell capacity metric, and wherein a UE measurement of the UE measurements comprises a reference signal received power (RSRP) metric, a signal-to-interference-plus-noise ratio (SINR) metric, or a continuous quality improvement (CQI) metric.

3. The device of claim 1, wherein the configurable period of time is at least one of: a minute, an hour, a day, a week, a month, or a year.

4. The device of claim 1, wherein the determining of the threshold update further comprises determining a variance between a UE measurement of the UE measurements and a predicted value indicated by one of the at least two Eigenvectors.

5. The device of claim 4, wherein the determining of the threshold update further comprises determining the threshold update as a function of the variance over the configurable period of time and a cell status over the configurable period of time.

6. The device of claim 1, wherein the threshold update represents an increase or a decrease to the threshold determined by the interference detection xApp based on an amount of variance determined by the threshold rApp.

7. The device of claim 1, wherein the operations further comprise, based at least on the history data, determining, via a slot rApp of the non-RT RIC, determining an average CQI score for each time slot associated with the cell, wherein the average CQI score is indicative of reported CQI values for a particular time slot of the cell that is averaged across different frequency sub bands over an interval of a defined period.

8. The device of claim 7, wherein the interval is an hour and the defined period is a week.

9. The device of claim 7, wherein the operations further comprise transmitting to the cell a recommended slot to ban for the interval of the defined period in response to determining that the recommended slot has a lowest CQI score among other time slots.

10. The device of claim 9, in response to receiving feedback from the interference detection xApp relating to negative acknowledgements (NACKs) from the UE, updating a CQI score of the recommended slot to ban by a weighting factor.

11. A device, comprising:
at least one processor; and
at least one memory that stores executable instructions that, when executed by the at least one processor, facilitate performance of operations, comprising:
receiving, via a slot rApp of a non-real time radio access network intelligent controller (non-RT RIC), history data comprising UE continuous quality improvement (CQI) measurements reported to a cell over intervals of a defined period of time;
determining, via the slot rApp, respective CQI scores for respective time slots, wherein a CQI score of the respective CQI scores is indicative of measured CQIs across different frequency sub bands over an interval of the intervals;

determining, via the slot rApp, a recommended slot to ban during the interval based on the CQI score being the lowest among the respective CQI scores; and transmitting the recommended slot to an interference detection xApp or a scheduler executing on a near-real time radio access network intelligent controller (near-RT RIC).

12. The device of claim 11, in response to receiving feedback from the interference detection xApp relating to negative acknowledgements (NACKs) from a user equipment (UE), updating the CQI score of the recommended slot to ban by a weighting factor.

13. The device of claim 11, wherein the history data further comprises cell history data indicative of cell status information for the cell over a configurable period of time greater than one second and user equipment (UE) history data indicative of UE measurements reported to the cell over at least a portion of the configurable period of time, and wherein the operations further comprise determining, via a threshold rApp executing on the non-RT RIC, a threshold update for a threshold determined by the interference detection xApp.

14. The device of claim 13, wherein the determining of the threshold update comprises:

determining at least two Eigenvectors from at least two metrics of the UE history data;

determining a variance between the UE measurements and a predicted value indicated by one of the at least two Eigenvectors; and determining that the threshold determined by the interference detection xApp is to be increased in response to the variance being above a reference and to be decreased in response to the variance being below the reference.

15. The device of claim 13, wherein the operations further comprise:

transmitting the threshold update to the interference detection xApp.

16. A method, comprising:

receiving, by a device comprising at least one processor, history data comprising cell history data indicative of cell status information for a cell over a configurable period of time greater than one second and user equipment (UE) history data indicative of UE measurements reported to the cell over at least a portion of the configurable period of time;

determining, by the device, a threshold update based on the history data, wherein the threshold update represents an update for a threshold determined by an interference detection xApp executing on a near-real time radio access network intelligent controller (near-RT RIC);

transmitting, by the device, the threshold update to the near-RT RIC; and transmitting, by the device, a recommended slot to ban for an interval of a defined period in response to determining that the recommended slot has a lowest CQI score among other time slots for the cell.

17. The method of claim 16, further comprising determining, by the device and based at least on the history data, an average continuous quality improvement (CQI) score for each time slot associated with the cell, wherein the average CQI score is indicative of reported CQI values for a particular time slot of the cell that is averaged across different frequency sub bands over an hour of a week.

18. The method of claim 16, further comprising, in response to receiving feedback from the interference detection xApp relating to negative acknowledgements (NACKs) from the UE, updating, by the device, a CQI score of the recommended slot to ban by a weighting factor.

19. The method of claim 16, wherein the configurable period of time is at least one of: a minute, an hour, a day, a week, a month, or a year.

20. The method of claim 16, wherein the threshold update represents an increase or a decrease to the threshold determined by the interference detection xApp based on an amount of variance.

* * * * *